United States Patent
Nakamoto et al.

(10) Patent No.: US 11,754,251 B2
(45) Date of Patent: Sep. 12, 2023

(54) VEHICULAR LAMP

(71) Applicant: STANLEY ELECTRIC CO., LTD., Tokyo (JP)

(72) Inventors: Takuya Nakamoto, Tokyo (JP); Koichi Sasaki, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 11 days.

(21) Appl. No.: 17/847,667

(22) Filed: Jun. 23, 2022

(65) Prior Publication Data
US 2022/0412532 A1    Dec. 29, 2022

(30) Foreign Application Priority Data

Jun. 23, 2021   (JP) ................................. 2021-103897

(51) Int. Cl.
| | |
|---|---|
| *F21S 43/245* | (2018.01) |
| *F21S 43/14* | (2018.01) |
| *F21S 43/40* | (2018.01) |
| *F21S 43/33* | (2018.01) |
| *F21S 43/20* | (2018.01) |
| *F21Y 115/10* | (2016.01) |

(52) U.S. Cl.
CPC ............ *F21S 43/245* (2018.01); *F21S 43/14* (2018.01); *F21S 43/26* (2018.01); *F21S 43/33* (2018.01); *F21S 43/40* (2018.01); *F21Y 2115/10* (2016.08)

(58) Field of Classification Search
CPC .......... F21S 43/245; F21S 43/33; F21S 43/40; F21S 43/14; F21S 43/26
See application file for complete search history.

(56) References Cited

U.S. PATENT DOCUMENTS

| | | | |
|---|---|---|---|
| 10,215,360 B1* | 2/2019 | Grogan | F21S 43/247 |
| 10,400,981 B1* | 9/2019 | Kingen | B60Q 1/304 |
| 2016/0138773 A1* | 5/2016 | Kawabata | F21S 43/249 |
| | | | 362/511 |
| 2018/0313515 A1* | 11/2018 | Ramos, II | F21S 43/243 |
| 2019/0203903 A1* | 7/2019 | Nishimura | F21S 41/43 |
| 2019/0226658 A1* | 7/2019 | Kawai | F21S 41/151 |
| 2021/0180761 A1* | 6/2021 | Czirmer | B60Q 1/304 |
| 2022/0128214 A1* | 4/2022 | Sato | F21S 43/255 |
| 2022/0268412 A1* | 8/2022 | Iwao | F21S 43/245 |

FOREIGN PATENT DOCUMENTS

JP    2016-134326 A    7/2016

* cited by examiner

*Primary Examiner* — Christopher E Dunay
(74) *Attorney, Agent, or Firm* — Kenealy Vaidya LLP

(57) ABSTRACT

A vehicular lamp is provided capable of enabling an observer to visually recognize the first and the second light-emitting areas as if they are integrated (connected) with each other when emitting light regardless of viewpoint positions. The vehicular lamp includes: a first light-emitting area and a second light-emitting area adjacent to each other in a horizontal direction with a gap; a third light-emitting area observed through the gap; a gap light-emitting unit disposed behind the gap; and a light control unit disposed between the gap and the gap light-emitting unit. The gap light-emitting unit includes a front and upper view light-emitting units disposed therebelow. The upper view light-emitting unit and the light control unit each have a lower portion extending downward. The light control unit includes an optical element controlling light from the upper view light-emitting unit by a predetermined angle upward so that the light passes through the gap.

16 Claims, 9 Drawing Sheets

VEHICULAR LAMP

This application claims the priority benefit under 35 U.S.C. § 119 of Japanese Patent Application No. 2021-103897 filed on Jun. 23, 2021, which is hereby incorporated in its entirety by reference.

TECHNICAL FIELD

The presently disclosed subject matter relates to a vehicular lamp, and more specifically, to a vehicular lamp capable of being visually recognized as if the first light-emitting region and the second light-emitting region are integrated (connected) with each other when emitting light regardless of the viewpoint position.

BACKGROUND ART

FIG. 1A is a cross-sectional view of a vehicular lamp described in Japanese Patent Application Laid-Open No. 2016-134326, and FIG. 1B is a cross-sectional view of the vehicular lamp of FIG. 1A taken along line A1-A1.

As shown in FIG. 1A, a vehicular lamp may include rear combination lamps 100 provided on left and right sides of a rear end of a vehicle body, and a lid lamp 110 provided on moving portions such as a trunk lid of the vehicle body. In a case where the rear combination lamps 100 and the lid lamp 110 are disposed to be adjacent to each other with a gap 120 inbetween in the horizontal direction (in a state of the trunk lid being closed), in order to prevent the formation of an unilluminated area (an unilluminated area corresponding to the gap 120) between a first light-emitting area a1, formed by turning on the rear combination lamps 100, and a second light-emitting area a2, formed by turning on the lid lamp 110 and also in order to allow the first light-emitting area a1 and the second light-emitting area a2 to be visually recognized as if they are integrated when emitting light, it has been proposed to dispose a light-emitting unit 130 behind the gap 120, like that disclosed in Japanese Patent Application Laid-Open No. 2016-134326. In this publication, the light-emitting unit 130 can emit light by producing light from a light source 140 incident on a light guide portion 150, internally reflecting the light by lens cuts provided on a rear surface of the light guide portion 150, and causing the reflected light to exit through the surface of the light guide portion 150.

FIG. 2A is a schematic diagram of a positional relationship between the first light-emitting area a1, the second light-emitting area a2, and a third light-emitting area a3 or the light-emitting unit 130, when visually recognized from a position p1 indicated in FIG. 1B. FIG. 2B is a schematic diagram of a positional relationship between the first light-emitting area a1, the second light-emitting area a2, and the third light-emitting area a3 or the light-emitting unit 130, when visually recognized from a position p2 indicated in FIG. 1B.

In Japanese Patent Application Laid-Open No. 2016-134326, when the vehicular lamp is visually recognized from the position p1 (see FIG. 1B), the third light-emitting area a3 (light-emitting unit 130) does not protrude from the gap 120 (does not diverge) as illustrated in FIG. 2A, thus, enabling the visual recognition of the first light-emitting area a1 and the second light-emitting area a2 as if they are integrated (connected) when emitting light.

However, when the present inventors have studied Japanese Patent Application Laid-Open No. 2016-134326, the light-emitting unit 130 is disposed at a position shifted rearward of the gap 120 (see FIGS. 1A and 1B). When the vehicular lamp is visually recognized from the position p2 above the position p1 (see FIG. 1B), the third light-emitting area a3 or the light-emitting unit 130 protrudes (is diverged) from the gap 120 as illustrated in FIG. 2B. Thus, there arises a problem in which the first light-emitting area a1 and the second light-emitting area a2 cannot be visually recognized as if they are integrated (connected) when emitting light.

SUMMARY

The presently disclosed subject matter was devised in view of these and other problems and features in association with the conventional art. An aspect of the presently disclosed subject matter is to provide a vehicular lamp capable of enabling an observer to visually recognize the first light-emitting area and the second light-emitting area as if they are integrated (connected) with each other when emitting light regardless of the observer's viewpoint position.

A vehicular lamp made in accordance with principles of the presently disclosed subject matter includes: a first light-emitting area and a second light-emitting area which are arranged to be adjacent to each other in a horizontal direction with a gap formed therebetween; a third light-emitting area which is visually observed through the gap; a gap light-emitting unit disposed behind the gap; and a light control unit disposed between the gap and the gap light-emitting unit. In this vehicular lamp, the gap light-emitting unit includes a front view light-emitting unit and an upper view light-emitting unit disposed below the front view light-emitting unit. The upper view light-emitting unit and the light control unit each have a lower portion that extends downward from the gap, and the light control unit includes an optical element which directs light from the upper view light-emitting unit to travel by a predetermined angle upward with respect to a horizontal plane so that the light from the upper view light-emitting unit passes through the gap.

With such a configuration, regardless of observer's viewpoint positions, the first light-emitting area and the second light-emitting area can be visually recognized as if they are integrated (connected) with each other when emitting light.

This can be achieved because of the following reason. That is, with the vehicular lamp, the light control unit, i.e., the optical element, can direct the light from the upper view light-emitting unit to travel by a predetermined angle upward with respect to a horizontal plane so that the light from the upper view light-emitting unit passes through the gap. Therefore, even if the line of sight is moved up and down, the third light-emitting area can be formed (always visually recognized) within the gap between the first and second light-emitting areas, without the third light-emitting area protruding from the gap.

In the vehicular lamp, the optical element can have a plurality of lens cuts configured to refract the light from the upper view light-emitting unit by a first angle upward with respect to the horizontal plane, the plurality of lens cuts can be arranged in a vertical direction, with the first angle being larger, the lower the lens cuts are located.

Furthermore, in the vehicular lamp, the optical element can be an upper view shutter group including a plurality of inclined shutters. The inclined shutters can be arranged to be spaced apart from one another in the vertical direction so that light traveling upward by a predetermined angle with respect to the horizontal plane, contained in the light from the upper view light-emitting unit, passes the inclined shutters, and as the inclined shutter is located at a lower position, a second angle of the inclined shutter with respect to the horizontal plane can be made larger.

Furthermore, in the vehicular lamp, the light control unit can include a front view shutter group including a plurality of horizontal shutters. The plurality of horizontal shutters can be arranged to be spaced apart from one another in the vertical direction so that light traveling in the horizontal direction, contained in the light from the front view light-emitting unit, passes through the horizontal shutters, the front view shutter group can be disposed across a common opening above the upper view shutter group, and as the horizontal shutter is located at a lower position, the plurality of horizontal shutters can have a shorter length.

The vehicular lamp can further include a diffusion lens unit or a diffusion surface configured to diffuse light controlled by the light control unit, and the diffusion lens unit or the diffusion surface can be disposed between the light control unit and the gap.

In the vehicular lamp, the first light-emitting area can be disposed at a rear end portion of a vehicle, and the second light-emitting area can be disposed at a movable portion, movable in respect to the first light-emitting area.

Effect of the Invention

According to the presently disclosed subject matter, it is possible to provide a vehicular lamp capable of enabling an observer to visually recognize the first light-emitting area and the second light-emitting area as if they are integrated (connected) with each other when emitting light regardless of the observer's viewpoint position.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1A:
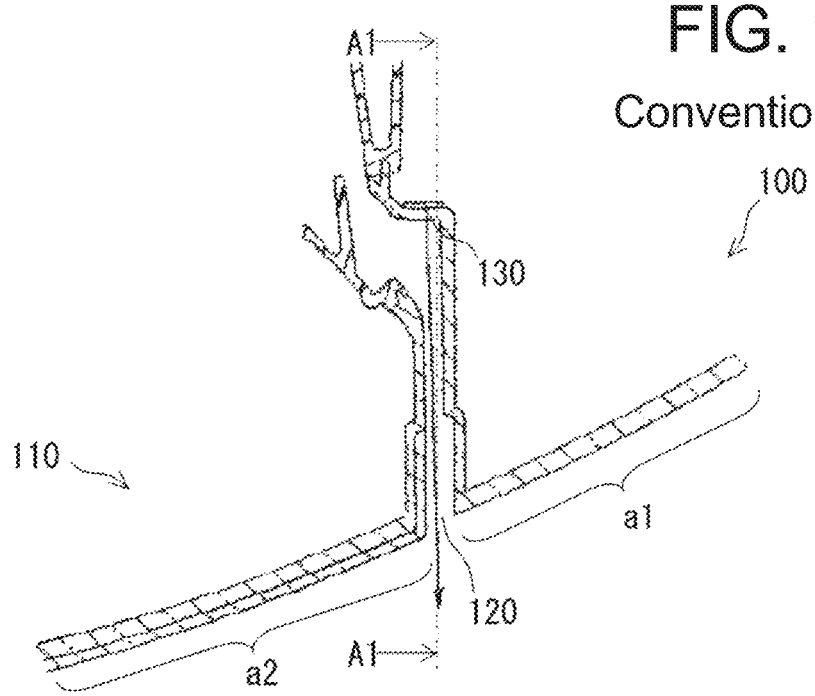
FIG. 1A is a cross-sectional view of a vehicular lamp described in Japanese Patent Application Laid-Open No. 2016-134326.
Figure 1B:
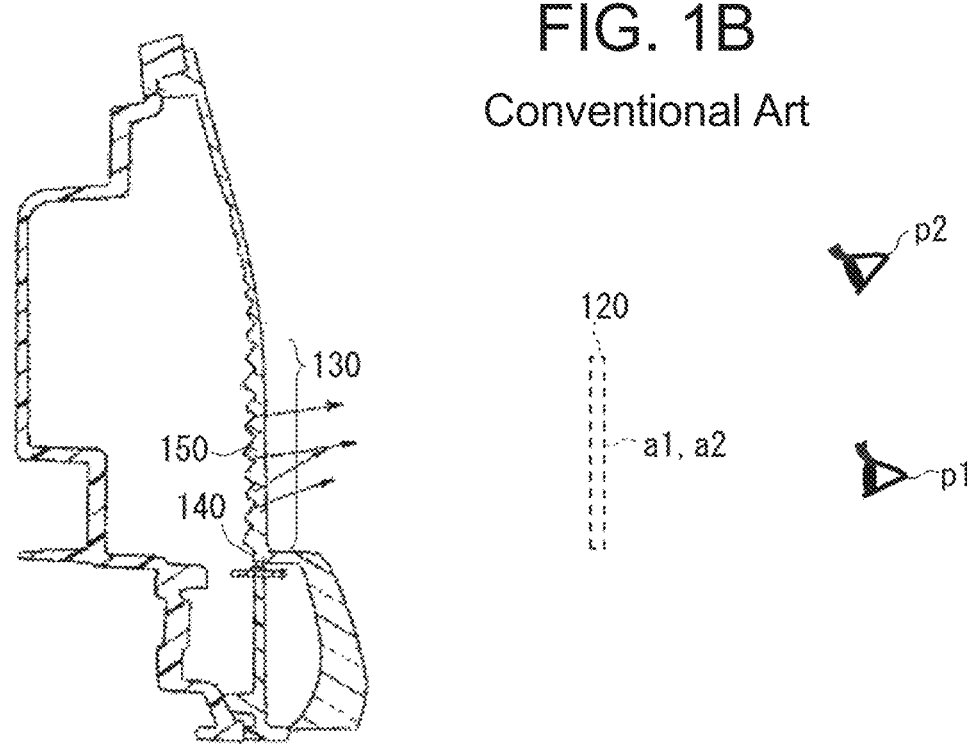
FIG. 1B is a cross-sectional view of the vehicular lamp of FIG. 1A taken along line A1-A1.
Figure 2A:
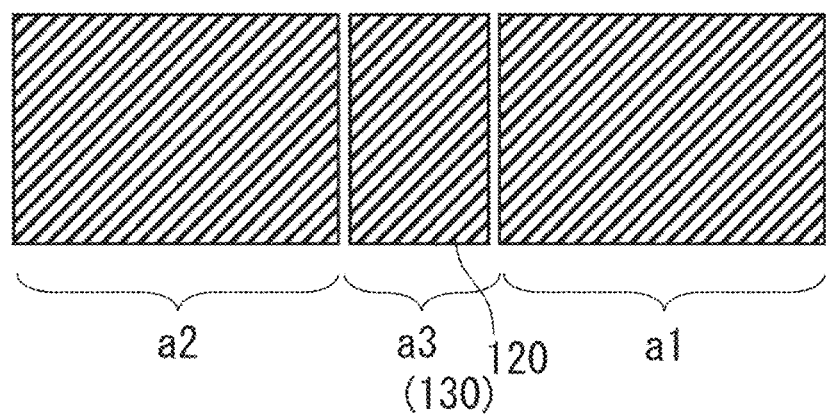
FIG. 2A is a schematic diagram of a positional relationship between a first light-emitting area a1, a second light-emitting area a2, and a third light-emitting area a3 or a light-emitting unit 130, when visually recognized from a position p1 indicated in FIG. 1B.
Figure 2B:
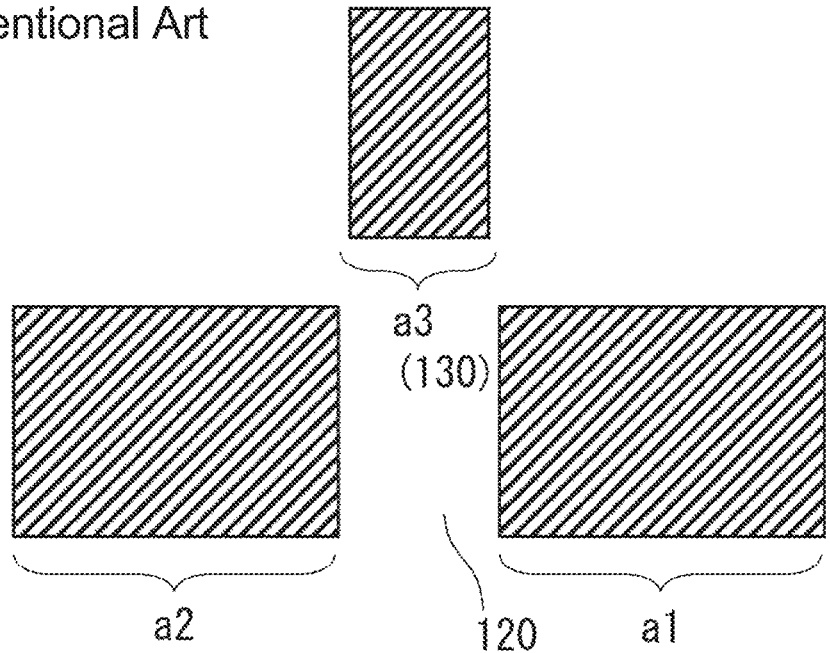
FIG. 2B is a schematic diagram of a positional relationship between the first light-emitting area a1, the second light-emitting area a2, and the third light-emitting area a3 or the light-emitting unit 130, when visually recognized from a position p2 indicated in FIG. 1B.

Hereinafter, a vehicular lamp 30 according to a first embodiment of the presently disclosed subject matter will be described with reference to the accompanying drawings. Components corresponding to each other in the respective drawings will be denoted by the same reference numerals, and a repetitive description thereof will be omitted.

Figure 3:
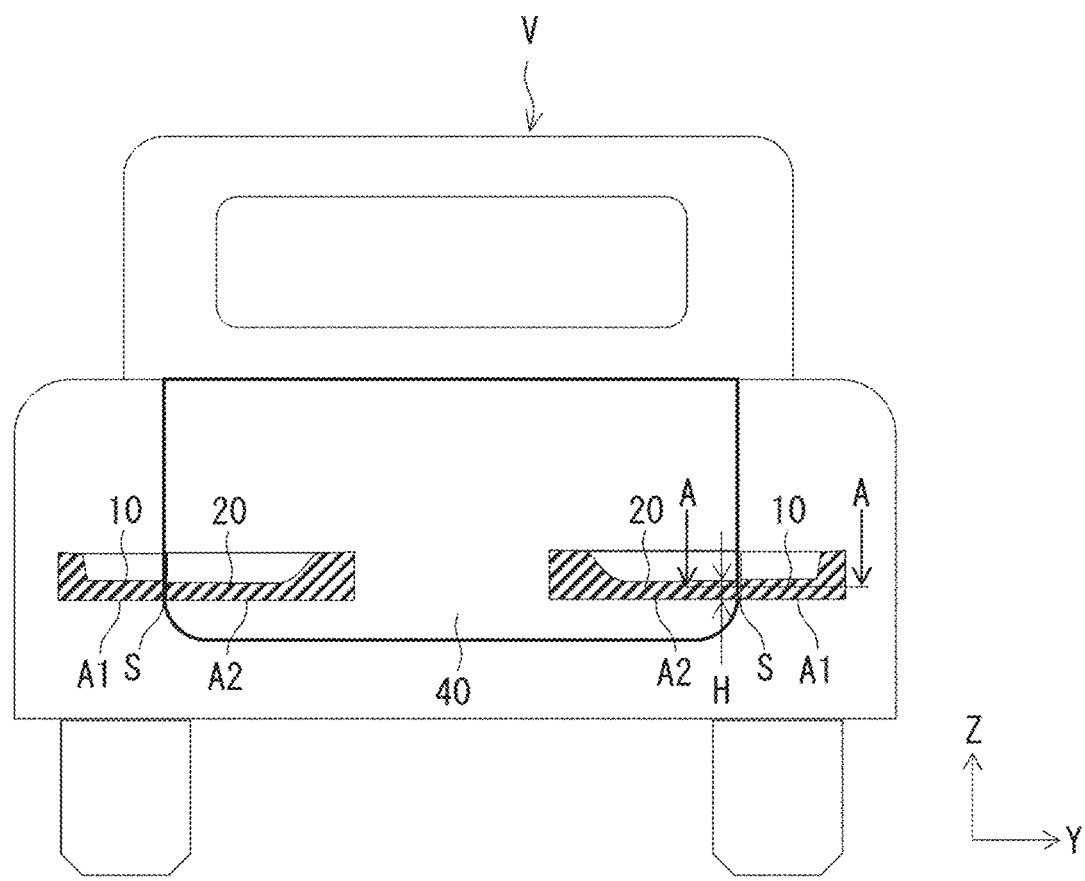
FIG. 3 is a front view of a rear end portion of a vehicle V on which a vehicular lamp 30 is mounted.
Figure 4:
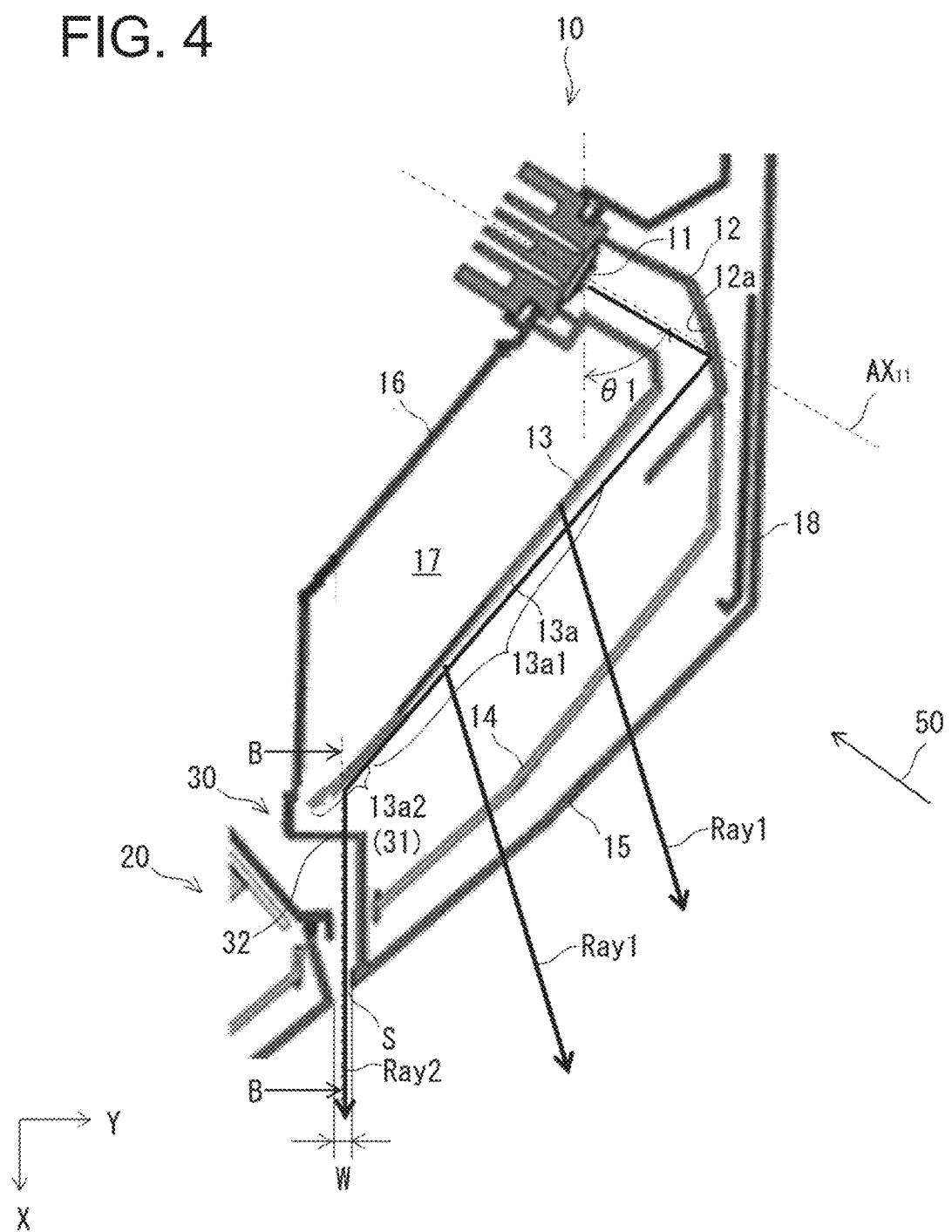
FIG. 4 is a cross-sectional view taken along line A-A of FIG. 3.

FIG. 3 is a front view of a rear end portion of a vehicle V on which the vehicular lamp 30 (not illustrated) is mounted. FIG. 4 is a cross-sectional view taken along line A-A of FIG. 3.

As shown in FIG. 3, a rear combination lamp 10 and a lid lamp 20 are each disposed on both left and right sides of the rear end portion of the vehicle V such as an automobile. The lid lamp 20 is disposed on a movable portion 40 such as a trunk lid provided at the rear end portion of the vehicle V (see FIG. 3). Hereinafter, for convenience of description, the XYZ axis will be defined as shown in FIG. 3 and the like, where the X-axis extends in a vehicle longitudinal direction, the Y-axis extends in a vehicle width direction, and the Z-axis extends in a vertical direction.

The rear combination lamp 10 and the lid lamp 20 are arranged so as to be adjacent to each other across the gap S in the Y-axis direction (see FIGS. 3 and 4) in a state where the movable portion 40 is closed. At that time, the rear combination lamp 10 and the lid lamp 20 are arranged with their respective ends facing each other. Heights H of the end portions facing each other, and of the rear combination lamp 10 and the lid lamp 20 in the Z-axis direction (see FIG. 3) are identical. Furthermore, a width W of the gap S in the Y-axis direction (see FIG. 4) can be, for example, about 5 mm.

As shown in FIG. 4, the vehicular lamp 30 is disposed behind the gap S between the rear combination lamp 10 and the lid lamp 20. Since the rear combination lamp 10, the lid lamp 20, and the vehicular lamp 30, which are mounted on the left and right sides, have a symmetrical configuration, a rear combination lamp 10, a lid lamp 20, and a vehicular lamp 30, which are to be mounted on the right side of the rear end portion of the vehicle (right side toward the vehicle front), will hereinafter be described as a representative example.

The rear combination lamp 10 and the lid lamp 20 are turned on simultaneously and function, for example, as a tail lamp, a stop lamp, etc. The optical system constituting the rear combination lamp 10 and the lid lamp 20 may have any configuration so long as the target lamp function (e.g., a tail lamp, a stop lamp, etc.) can be realized. For example, the optical system constituting the rear combination lamp 10 and the lid lamp 20 may be an optical system obtained by combining a light source such as an LED and a reflecting surface, an optical system obtained by combining a light source such as an LED and a light guide body (e.g., a light guide plate or a light guide rod), or other optical systems.

An example of the rear combination lamp 10 will be described. As the lid lamp 20, a commonly-known product can be used, and a description thereof is omitted.

As shown in FIG. 4, the rear combination lamp 10 includes a light source 11, a first reflector 12, a second reflector 13, an inner lens 14, an outer lens 15, and a housing 16.

The light source 11 is a socket-type light source, and includes, for example, at least one semiconductor light emitting element such as an LED that emits red light. The light source 11 is attached to the housing 16 after being inserted into a through hole formed in the housing 16. The optical axis $AX_{11}$ of the light source 11 is inclined outward in a vehicle widthwise direction with respect to the X-axis direction by an angle θ1.

The first reflector 12 includes a first reflecting surface 12a disposed in front of the light source 11. The first reflecting surface 12a reflects light from the light source 11.

The second reflector 13 includes a second reflecting surface 13a extending from the front side of the first reflecting surface 12a toward the vehicle rear direction and inward in the vehicle width direction. The second reflecting surface 13a reflects the reflected light from the first reflecting surface 12a.

Figure 5:
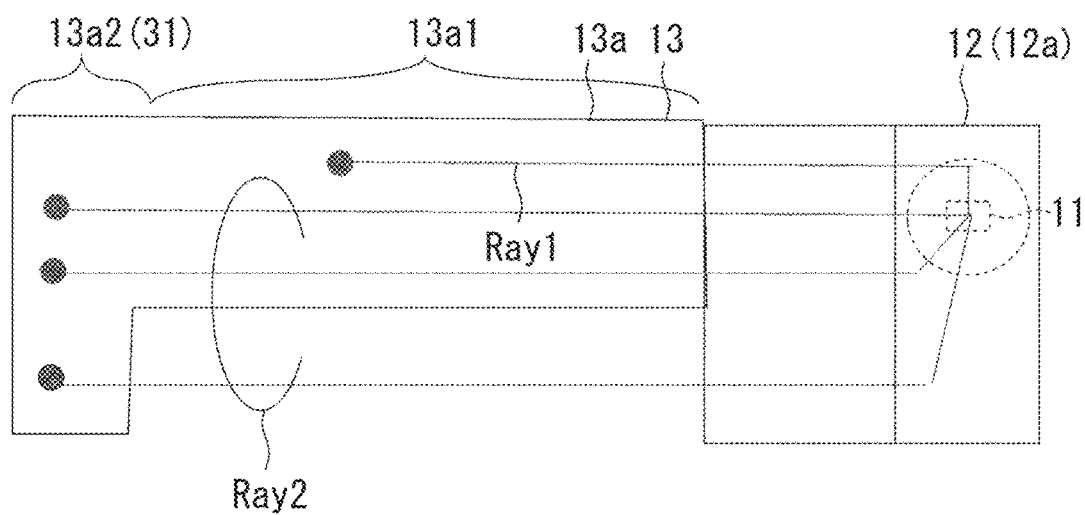
FIG. 5 is a view illustrating a first reflector 12 and a second reflector 13 (second reflecting surface 13a) as viewed from a direction indicated by an arrow 50 in FIG. 4 while an inner lens 14, an outer lens 15, etc. are omitted.

FIG. 5 is a view illustrating the first reflector 12 and the second reflector 13 (and the second reflecting surface 13a) as viewed from a direction indicated by an arrow 50 in FIG. 4 while an inner lens 14, an outer lens 15, etc. are omitted.

As shown in FIG. 5, the second reflecting surface 13a includes a main reflecting surface 13a1 and a gap reflecting surface 13a2.

The main reflecting surface 13a1 is disposed between the gap S and the first reflecting surface 12a (see FIG. 4). Reflected light Ray1 that has been reflected from the first reflecting surface 12a and incident on the main reflecting surface 13a1 (see FIG. 5) is emitted to the rear of the vehicle through the inner lens 14 and outer lens 15 (see FIG. 4).

The gap reflecting surface 13a2 is disposed behind the gap S (see FIG. 4). Reflected light Ray2 that has been reflected from the first reflecting surface 12a and incident on the gap reflecting surface 13a2 (see FIG. 5) is directed by a light control unit 32 as described later, and is emitted to the vehicle rear through the gap S (see FIG. 4).

The inner lens 14 is made of a transparent resin such as an acrylic or polycarbonate resin, and is disposed in front of the second reflector 13 (the second reflecting surface 13a).

The outer lens 15 is made of a transparent resin such as an acrylic or polycarbonate resin, and is disposed in front of the inner lens 14. The outer lens 15 is attached to the housing 16 to constitute a lamp chamber 17 between it and the housing 16. The light source 11 (light-emitting unit), the first reflector 12 (first reflecting surface 12a), the second reflector 13 (second reflecting surface 13a), and the inner lens 14 are disposed in the lamp chamber 17. Reference numeral 18 in FIG. 4 denotes an extension (decorative member) provided so that the internal structure is not visible from the outside through the outer lens 15.

In the rear combination lamp 10 with the above-mentioned configuration, when turning on the light source 11, the light emitted by the light source 11 is reflected by the first reflecting surface 12a, and is incident on the second reflecting surface 13a.

Reflected light Ray1 that has been reflected from the first reflecting surface 12a and incident on the main reflecting surface 13a1 of the second reflecting surface 13a (see FIG. 5) is emitted to the rear of the vehicle through the inner lens 14 and outer lens 15 (see FIG. 4).

On the other hand, the reflected light Ray2 that has been reflected from the first reflecting surface 12a and incident on the gap reflecting surface 13a2 of the second reflecting surface 13a (see FIG. 5) is directed by the light control unit 32 as described later to pass through the gap S (see FIG. 4).

In FIG. 3, a hatched region indicated by reference numeral A1 represents a first light-emitting area formed (visually recognized) by turning on the rear combination lamp 10 (light source 11), e.g., including the outer lens 15 constituting the rear combination lamp 10. Hereinafter, the region is described as a first light-emitting area A1. In FIG. 3, another hatched region indicated by reference numeral A2 represents a second light-emitting area formed (visually recognized) by turning on the lid lamp 20, e.g., including the outer lens constituting the lid lamp 20. Hereinafter, the region is described as a second light-emitting area A2.

Next, a third light-emitting area A3 visually recognized through the gap S between the first light-emitting area A1 and the second light-emitting area A2 will be described.

Figure 6A:
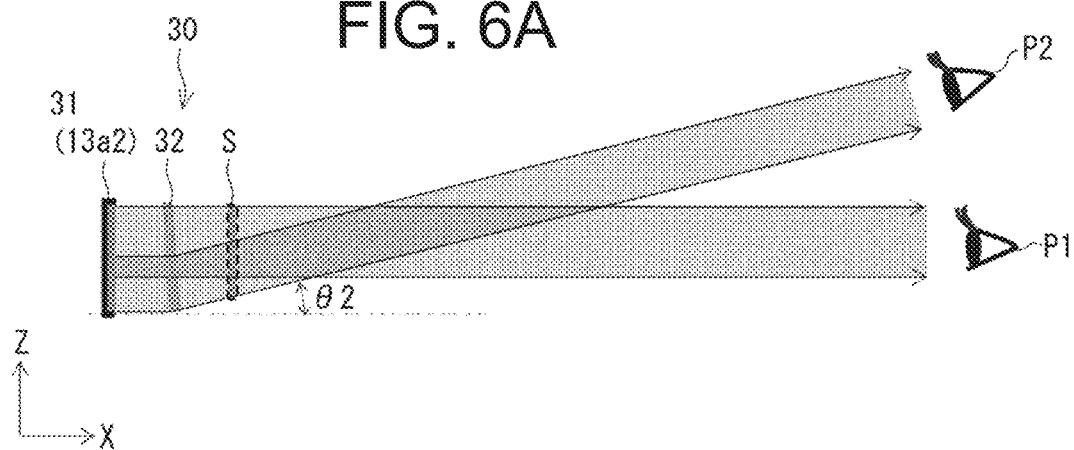
FIG. 6A is a diagram illustrating a relationship between a gap S and viewpoint positions P1 and P2.
Figure 6B:
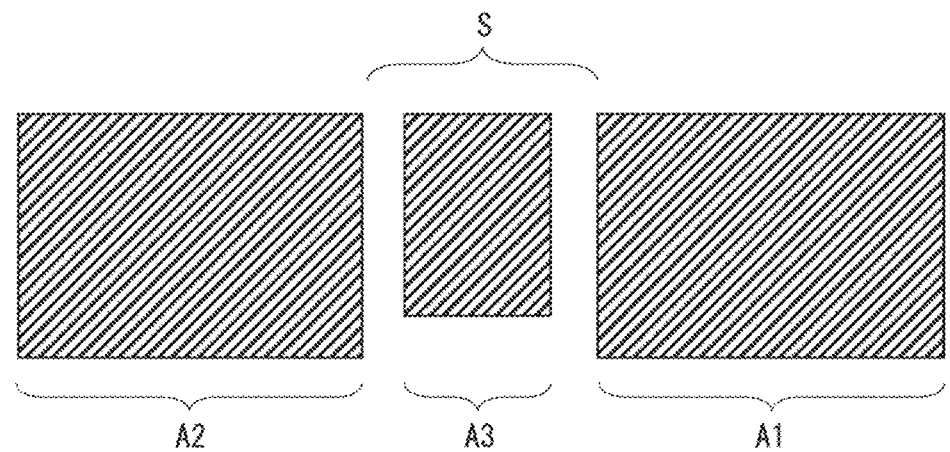
FIG. 6B is a front view illustrating the vehicular lamp when observed from a front position, i.e., an example of a third light-emitting area A3 which is visually recognized from the viewpoint position P1.
Figure 6C:
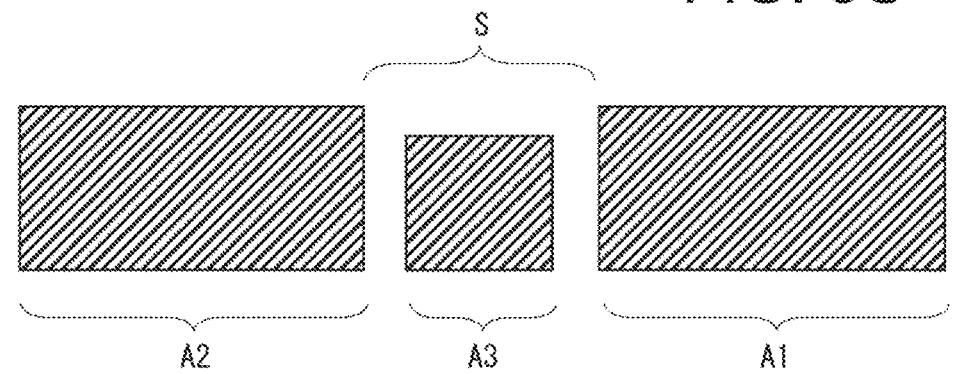
FIG. 6C is a front view illustrating the vehicular lamp when observed from an upper position, i.e., an example of the third light-emitting area A3 which is visually recognized from the viewpoint position P2 upward by a predetermined angle θ2 with respect to a horizontal plane.

FIG. 6A is a diagram illustrating a relationship between the gap S and viewpoint positions P1 and P2, FIG. 6B is a front view illustrating the vehicular lamp when observed from a front position, i.e., an example of the third light-emitting area A3 which is visually recognized from the viewpoint position P1, and FIG. 6C is a front view illustrating the vehicular lamp when observed from an upper position, i.e., an example of the third light-emitting area A3 which is visually recognized from the viewpoint position P2 upward by a predetermined angle θ2 with respect to a horizontal plan. The angle θ2 is, for example, 15 to 20°.

The third light-emitting area A3 can be formed (always visually recognized) in the gap S even if the line of sight is moved in the vertical direction (e.g., even when the viewpoint position is moved from P1 to P2).

For example, when viewed from the viewpoint position P1, as shown in FIG. 6B, the third light-emitting area A3 can be formed (visually recognized) in the gap S. Similarly, the third light-emitting area A3 can be formed (visually recognized) in the gap S as shown in FIG. 6C when viewed from the viewpoint position P2. Then, when the line of sight is moved in the vertical direction, for example, when the line of sight is moved gradually from the viewpoint position P1 to the viewpoint position P2, the third light-emitting area A3 is observed as if moving gradually from the position of FIG. 6B to the position of FIG. 6C following the movement of the line of sight (viewpoint position). Adversely, when the line of sight is gradually moved from the viewpoint position P2 to the viewpoint position P1, the third light-emitting area A3 is observed as if gradually moving from the position of FIG. 6C to the position of FIG. 6B following the movement of the line of sight (viewpoint position).

Next, a description will be given of an example where, even if the line of sight is moved up and down as described above (e.g., the position is moved from the viewpoint position P1 to the viewpoint position P2), the third light-emitting area A3 is formed (visually recognized) in the gap S. Hereinafter, a description will be given of an example of a vehicular lamp 30 integrated with the rear combination lamp 10. Note that the vehicular lamp 30 may be a separate member from the rear combination lamp 10. In this case, a commonly known rear combination lamp 10 can be used.

Figure 7A:
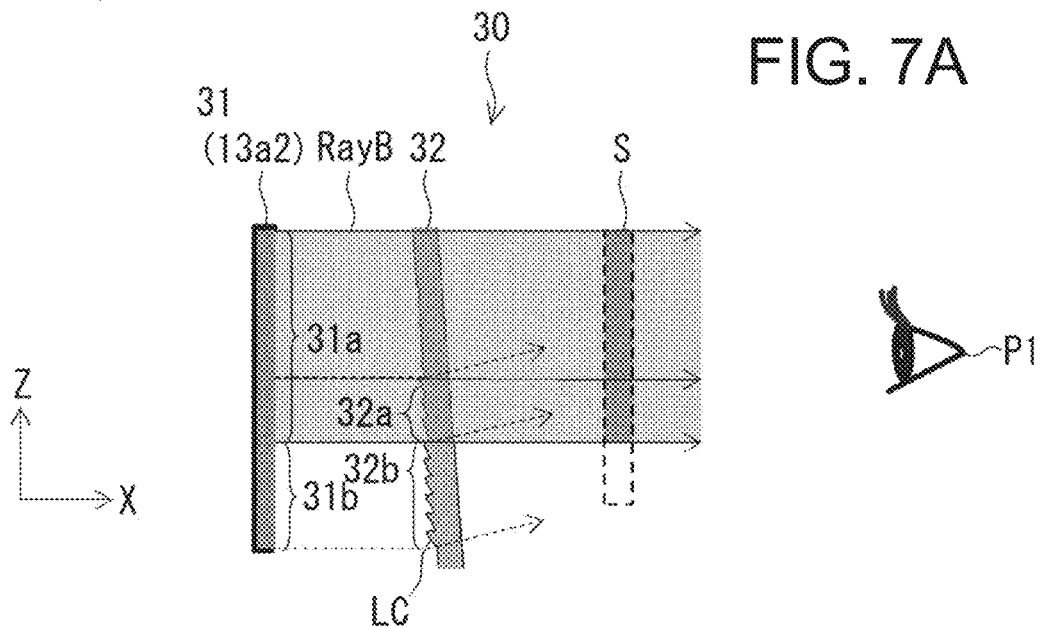
FIGS. 7A and 7B are each a cross-sectional view of FIG. 4 taken along line B-B.
Figure 7B:
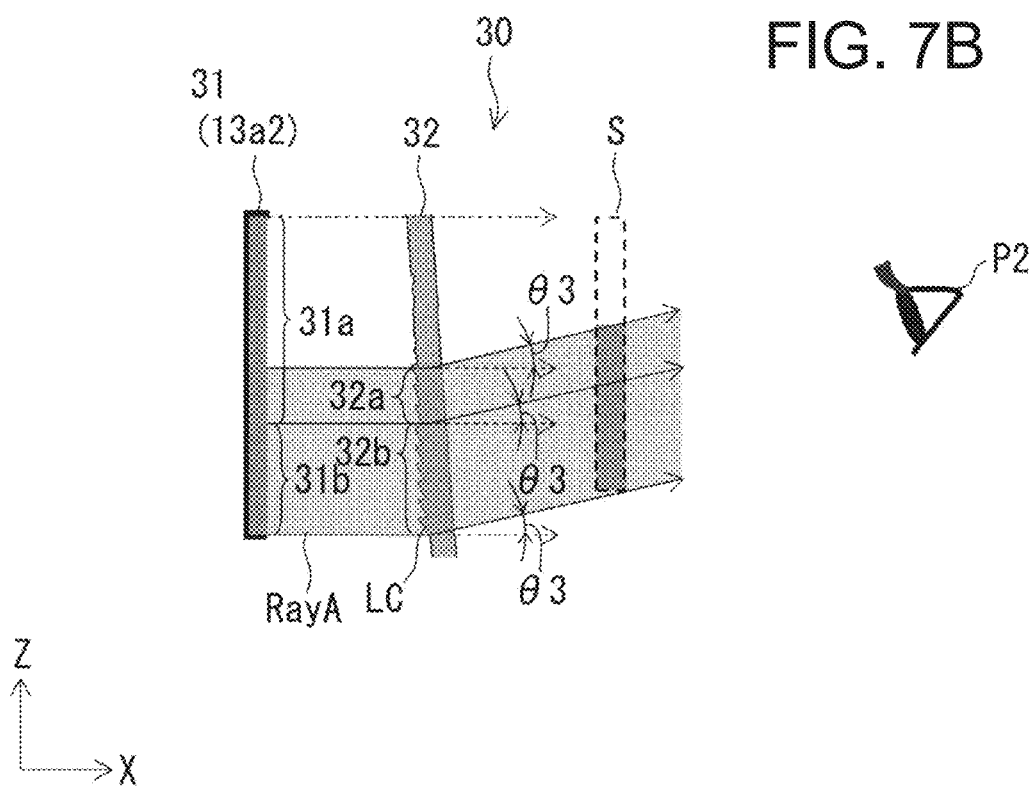

FIGS. 7A and 7B are each a cross-sectional view of FIG. 4 taken along line B-B.

As shown in FIG. 7A, the vehicular lamp 30 includes a gap light-emitting unit 31, and a light control unit 32.

The gap light-emitting unit 31 is, for example, a gap reflection surface 13a2 disposed behind the gap S. The gap light-emitting unit 31 emits light by reflecting the reflected light from the first reflecting surface 12a. The gap light-emitting unit 31 includes a front view light-emitting unit 31a and an upper view light-emitting unit 31b disposed below the front view light-emitting unit 31a.

The upper view light-emitting unit 31b has a lower portion, in front view, that extends downward from the gap S.

The light control unit 32 is, for example, a gap lens unit disposed between the gap S and the gap light-emitting unit 31. The light control unit 32 has a lower portion, in front view, that extends downward from the gap S. Hereinafter, the light control unit 32 may be described as the gap lens unit 32. The gap lens unit 32 is a part of the outer lens 15 (see FIG. 4). The gap lens unit 32 may be a separate member from the outer lens 15.

As shown in FIG. 7B, the gap lens unit 32 includes a plurality of optical elements configured to direct light RayA from the upper view light-emitting unit 31b to travel upward by a predetermined angle θ3 with respect to the horizontal plane so that the light RayA passes through the gap S. The optical elements can be composed of a plurality of lens cuts LC that each refract the light RayA from the upper view light-emitting unit 31b upward by an angle θ3 (an example of the first angle in the presently disclosed subject matter) with respect to the horizontal plane. The optical elements are specifically composed of a plurality of prismatic lens cuts. The lens cuts LC are arranged (formed) in the vertical direction in an area 32b of the gap lens unit 32 on which the light RayA from the upper view light-emitting unit 31b is incident. Furthermore, the lens cuts LC are also arranged (formed) in the vertical direction in an area 32a of the gap lens unit 32 on which the light RayB from the front view light-emitting unit 31a is incident.

The angle θ3 is not identical for all lens cuts LC, and is set so as to be larger (gradually larger) the lower the lens cut LC is located. Specifically, the angle θ3 is designed so as to be larger (gradually larger) the lower the lens cut LC is located so that the third light-emitting area A3 is formed (visually recognized) in the gap S (so as to be formed without protruding from the gap S) even when the line of sight is moved in the vertical direction (e.g., even when the line of sight is moved from the viewpoint position P1 to the viewpoint position P2). Such an angle θ3 can be determined using, for example, a predetermined simulation software.

In the vehicular lamp 30 with the above-mentioned configuration, as shown in FIG. 7A, the light RayB from the front view light-emitting unit 31a passes through the gap lens unit 32 and is emitted to the vehicle rear through the gap S. Herein, since the angle θ3 is small for the lens cuts LC disposed on the upper side, a part of the light RayB from the front view light-emitting unit 31a passes through the lens cut LC with the smaller angle θ3 and travels in the X-axis direction, and then passes through the gap S.

On the other hand, as shown in FIG. 7B, the light RayA from the upper view light-emitting unit 31b (and a part of the light RayB from the front view light-emitting unit 31a) is refracted by the lens cuts LC by the angle θ3 upward with respect to the horizontal plane, and then passes through the gap S.

As a result, when viewed from the front position, that is, from the viewpoint position P1, the third light-emitting area A3 is formed (visually recognized) in the gap S between the first light-emitting area A1 and the second light-emitting area A2, as shown in FIG. 6B.

On the other hand, when viewed from the upper position, i.e., from the viewpoint position P2, the third light-emitting area A3 is formed (visually recognized) in the gap S between the first light-emitting area A1 and the second light-emitting area A2, as shown in FIG. 6C.

Then, since the angle θ3 is designed to be larger (gradually larger) the lower the lens cut LC is located, when the line of sight is moved in the vertical direction, for example, when gradually moved from the viewpoint position P1 to the viewpoint position P2, the light that is refracted by the lens cut LC becomes invisible in the order of smaller to larger angles θ3. As a result, the third light-emitting area A3 is observed as if moving gradually from the position of FIG. 6B to the position of FIG. 6C following the movement of the line of sight (viewpoint position).

As described above, even when the line of sight is moved vertically (e.g., being changed from the viewpoint position P1 to the viewpoint position P2), the third light-emitting area A3 is always formed (visually recognized) within the gap S between the rear combination lamp 10 (the first light-emitting area A1) and the lid lamp 20 (the second light-emitting area A2) (see FIGS. 6B and 6C) without protruding from the gap S. As a result, the first light-emitting area A1 and the second light-emitting area A2 are visually recognized as if they are integrated (connected) with each other when emitting light.

As described above, according to the first embodiment, regardless of the viewpoint position, the first light-emitting area A1 and the second light-emitting area A2 can be visually recognized as if they are integrated (connected) with each other when emitting light.

This is because the gap lens unit 32 includes a plurality of lens cuts LC configured to direct light RayA from the upper view light-emitting unit 31b to travel upward by a predetermined angle θ3 with respect to the horizontal plane so that the light RayA passes through the gap S. Thus, even when the line of sight is moved vertically, the third light-emitting area A3 is always formed (visually recognized) within the gap S between the rear combination lamp 10 (the first light-emitting area A1) and the lid lamp 20 (the second light-emitting area A2) (see FIGS. 6B and 6C) without protruding from the gap S.

In other words, as shown in FIG. 7B or the like, the lower portion of the upper view light-emitting unit 31b and the lower portion of the gap lens unit 32 are configured to extend downward more than the lower end of the gap S with respect to the Z-axis direction. Since the plurality of lens cuts LC are provided in the gap lens unit 32, the light RayA from the upper view light-emitting unit 31b can be directed to travel upward by the angle θ3 with respect to the horizontal plane. Thus, it is possible for the light RayA to pass through the gap S.

Next, a vehicular lamp 30A according to a second embodiment of the presently disclosed subject matter will be described with reference to the accompanying drawings. Components corresponding to each other in the respective drawings will be denoted by the same reference numerals, and a repetitive description thereof will be omitted.

A description will be given of mainly differences from the vehicular lamp 30 according to the first embodiment. The same components as those of the vehicular lamp 30 according to the first embodiment are denoted by the same reference numerals, and descriptions thereof will be omitted as appropriate.

Figure 8:
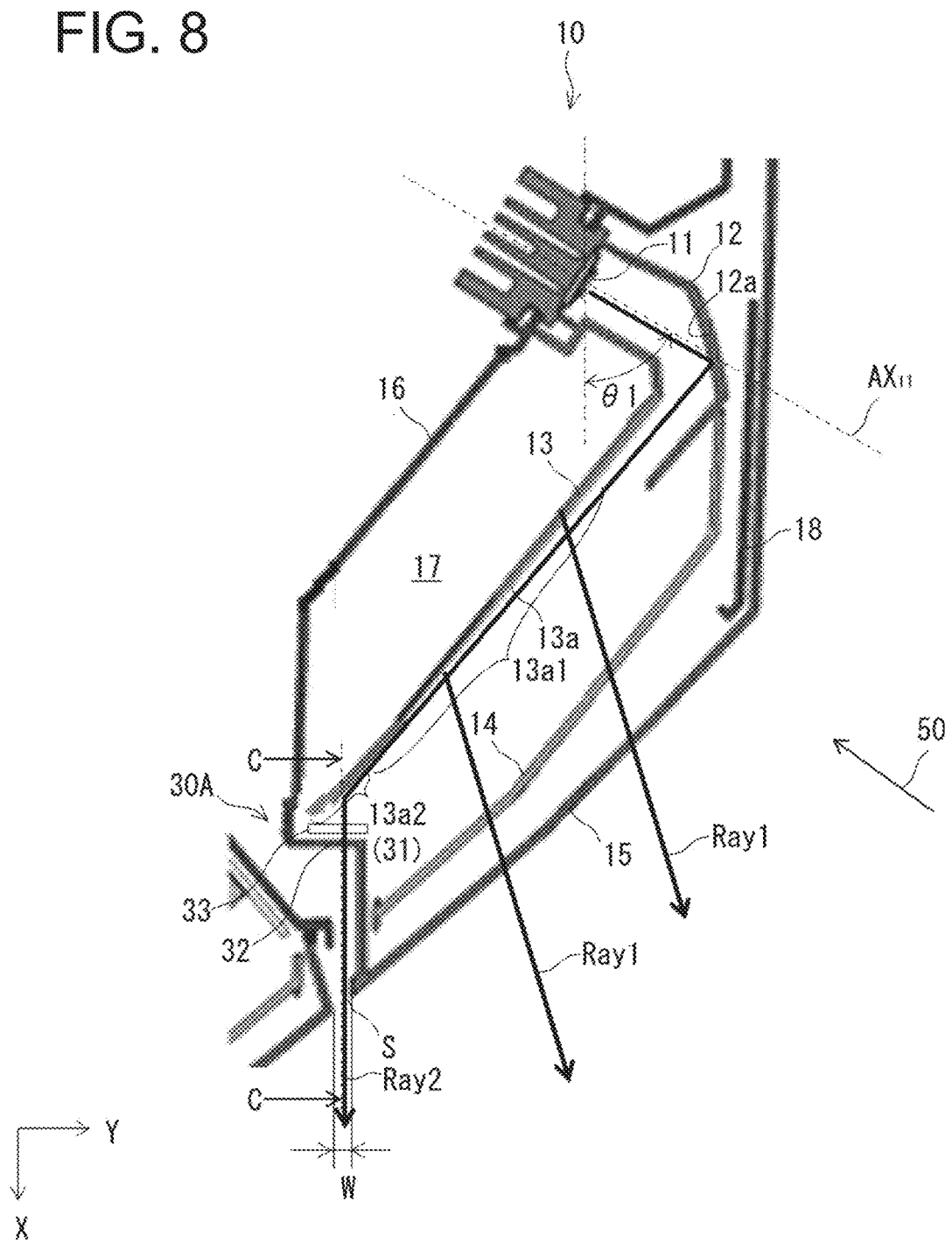
FIG. 8 is a cross-sectional view illustrating the vehicular lamp taken along line A-A of FIG. 3.

FIG. 8 is a cross-sectional view illustrating the vehicular lamp taken along line A-A of FIG. 3. The vehicular lamp 30A according to the present embodiment illustrated in FIG.

8 is different from the vehicular lamp 30 according to the first embodiment illustrated in FIG. 4 in that the vehicular lamp 30A uses a shutter unit 33 in place of the gap lens unit 32 as the light control unit, and in that the gap lens unit 32 is a plain lens unit without lens cuts LC. Except for these, the vehicular lamp 30A is configured identically as that in FIG. 4.

Next, the vehicular lamp 30A will be described.

Figure 9A:
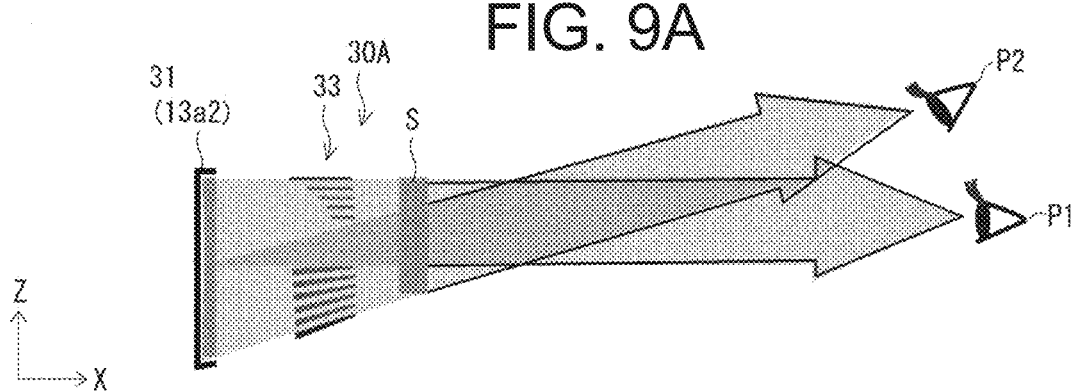
FIG. 9A is a diagram illustrating a relationship between the gap S and the viewpoint positions P1 and P2.
Figure 9B:
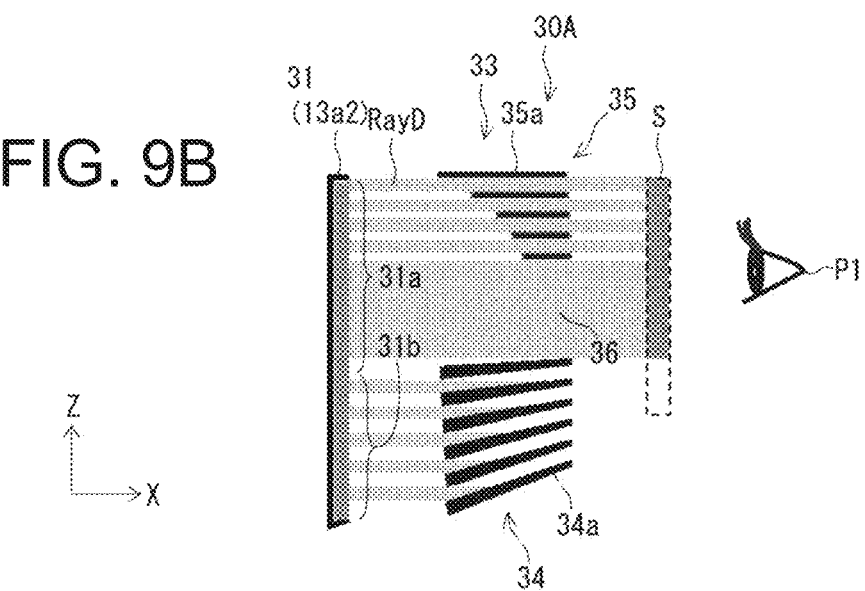
FIGS. 9B and 9C are each a cross-sectional view of the vehicular lamp taken along line C-C of FIG. 8.
Figure 9C:
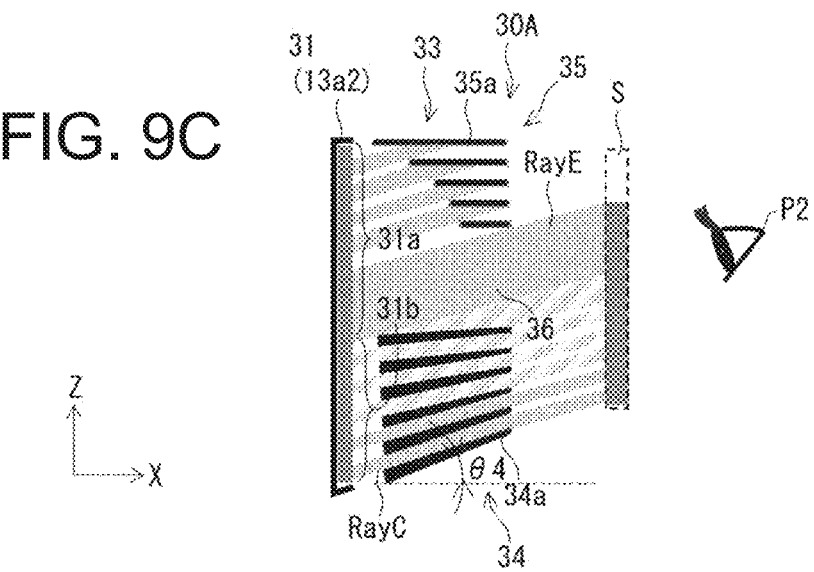

FIG. 9A is a diagram illustrating a relationship between the gap S and the viewpoint positions P1 and P2, and FIGS. 9B and 9C are each a cross-sectional view of the vehicular lamp 30A taken along line C-C of FIG. 8.

As shown in FIG. 9B, the vehicular lamp 30A includes a gap light-emitting unit 31, and an optical control unit 33.

The gap light-emitting unit 31 is, for example, a gap reflection surface 13a2 disposed behind the gap S. The gap light-emitting unit 31 emits light by reflecting the reflected light from the first reflecting surface 12a. The gap light-emitting unit 31 includes a front view light-emitting unit 31a and an upper view light-emitting unit 31b disposed below the front view light-emitting unit 31a.

The upper view light-emitting unit 31b has a lower portion, in front view, that extends downward from the gap S.

The light control unit 33 is, for example, a shutter unit disposed between the gap S and the gap light-emitting unit 31. The light control unit 33 has a lower portion, in front view, that extends downward from the gap S. Hereinafter, the light control unit 33 may be described as the shutter unit 33.

As shown in FIG. 9C, the shutter unit 33 includes a plurality of optical elements configured to direct light RayC from the upper view light-emitting unit 31b to travel upward by a predetermined angle θ4 with respect to the horizontal plane so that the light RayC passes through the gap S. The optical elements constitute an upper view shutter group 34 including a plurality of inclined shutters 34a. The inclined shutters 34a are arranged to be spaced apart from one another in the vertical direction in front of the upper view light-emitting unit 31b so that light RayC from the upper view light-emitting unit 31b pass therethrough.

The angle θ4 (an example of the second angle in the presently disclosed subject matter) of the inclined shutters 34a with respect to the horizontal plane is not identical for all the inclined shutters 34a, and is designed so as to be larger (gradually larger) the lower the inclined shutter 34a is located. Specifically, the angle θ4 is designed so as to be larger (gradually larger) the lower the inclined shutter 34a is located so that the third light-emitting area A3 is formed (visually recognized) in the gap S (so as to be formed without protruding from the gap S) even when the line of sight is moved in the vertical direction (e.g., even when the line of sight is moved from the viewpoint position P1 to the viewpoint position P2). Such an angle θ4 can be determined using, for example, a predetermined simulation software.

Furthermore, the shutter unit 33 includes a front view shutter group 35 including a plurality of horizontal shutters 35a.

As shown in FIG. 9B, the horizontal shutters 35a are arranged to be spaced apart from one another in the vertical direction so that light RayD from the front view light-emitting unit 31a pass therethrough.

The front view shutter group 35 is disposed, above the upper view shutter group 34, across a common opening 36 through which light from the front view light-emitting unit 31a passes. Although not shown, the front view shutter group 35 and the upper view shutter group 34 are held by, for example, a single frame.

The length of the horizontal shutter 35a (X-axis direction length) is not identical for all the horizontal shutter 35a, and is designed to be shorter (gradually shortened) the lower the horizontal shutter 35a is located. Specifically, the length of the horizontal shutter 35a (X-axis direction length) is designed so that, when the line of sight is moved in the vertical direction, for example, gradually moved from the viewpoint position P1 to the viewpoint position P2, light traveling toward the viewpoint position is shielded in order from the top and cannot be observed. The length of such horizontal shutter 35a (X-axis direction length) can be determined using, for example, a predetermined simulation software.

In the vehicular lamp 30A with the above-mentioned configuration, as shown in FIG. 9B, the light RayD from the front view light-emitting unit 31a passes through the front view shutter group 35 and the common opening 36, and passes through the gap S.

On the other hand, as shown in FIG. 9C, the light RayC from the upper view light-emitting portion 31b passes through the upper view shutter group 34, travels upward by the angle θ4 with respect to the horizontal plane, and passes through the gap S. Furthermore, light RayE from the front view light-emitting portion 31a passes through the common opening 36, travels upward by a predetermined angle with respect to the horizontal plane (e.g., the angle θ4), and passes through the gap S.

As a result, when viewed from the front position, that is, from the viewpoint position P1, the third light-emitting area A3 is formed (visually recognized) in the gap S between the first light-emitting area A1 and the second light-emitting area A2, as shown in FIG. 6B.

On the other hand, when viewed from the upper position, i.e., from the viewpoint position P2, the third light-emitting area A3 is formed (visually recognized) in the gap S between the first light-emitting area A1 and the second light-emitting area A2, as shown in FIG. 6C.

Then, when the line of sight is moved in the vertical direction, for example, when gradually moved from the viewpoint position P1 to the viewpoint position P2, the light traveling toward the viewpoint position direction is shielded in order by the horizontal shutter 35a from the top and cannot be observed. At that time, the angle θ4 of the inclined shutter 34a with respect to the horizontal plane is designed so as to be larger (gradually larger) the lower the inclined shutter 34a is located, and thus, the third light-emitting area A3 is observed as if moving gradually from the position of FIG. 6B to the position of FIG. 6C following the movement of the line of sight (viewpoint position).

As described above, even when the line of sight is moved vertically (e.g., being changed from the viewpoint position P1 to the viewpoint position P2), the third light-emitting area A3 is always formed (visually recognized) within the gap S between the rear combination lamp 10 (the first light-emitting area A1) and the lid lamp 20 (the second light-emitting area A2) (see FIGS. 6B and 6C) without protruding from the gap S. As a result, the first light-emitting area A1 and the second light-emitting area A2 are visually recognized as if they are integrated (connected) with each other when emitting light.

As described above, according to the second embodiment, regardless of the viewpoint position, the first light-emitting area A1 and the second light-emitting area A2 can be visually recognized as if they are integrated (connected) with each other when emitting light.

This is because the shutter unit 33 lens unit 32 includes the upper view shutter group 34 configured to direct light RayC from the upper view light-emitting unit 31b to travel upward by a predetermined angle θ4 with respect to the horizontal plane so that the light RayC passes through the gap S. Thus, even when the line of sight is moved vertically, the third light-emitting area A3 is always formed (visually recognized) within the gap S between the rear combination lamp 10 (the first light-emitting area A1) and the lid lamp 20 (the second light-emitting area A2) (see FIGS. 6B and 6C) without protruding from the gap S.

In other words, as shown in FIG. 9C or the like, the lower portion of the upper view light-emitting unit 31b and the lower portion of the shutter unit 33 are configured to extend downward more than the lower end of the gap S with respect to the Z-axis direction. Thus, the light RayC from the upper view light-emitting unit 31b can be directed to travel upward by the angle θ4 with respect to the horizontal plane, and it is possible for the light RayC to pass through the gap S.

Next, a modified example will be described.

In the first embodiment described above, a diffusion lens unit configured to diffuse the light which passed through the gap lens unit 32 may be disposed between the gap lens unit 32 and the gap S. The diffusion lens unit may be a diffusion lens unit including a diffusion surface which is subjected to a texture treatment or the like. Alternatively, the gap lens unit 32 may have a surface opposite to the gap S to serve as a diffusion surface, which may be subjected to a texture treatment or the like.

With this configuration, since the amount of light is reduced by diffusing the light which passed through the diffusion lens unit or the diffusion surface, the texture of the third light-emitting area A3 can be matched with the texture of the first and second light-emitting areas A1 and A2.

Similarly, in the second embodiment described above, a diffusion lens unit configured to diffuse the light which passed through the shutter unit 33 may be disposed between the shutter unit 33 and the gap S. The diffusion lens unit may include a diffusion surface which is subjected to a texture treatment or the like. For example, a plain gap lens unit 32 (see FIG. 9) without lens cuts LC may be used as the diffusion lens unit.

With this configuration, since the amount of light is reduced by diffusing the light which passed through the diffusion lens unit, the texture of the third light-emitting area A3 can be matched with the texture of the first and second light-emitting areas A1 and A2.

In each of the above-described embodiments, an example in which the first light-emitting area A1 is formed by the rear combination lamp 10 and the second light-emitting area A2 is formed by the lid lamp 20 has been described, but the presently disclosed subject matter is not limited thereto. For example, the first light-emitting area A1 may be formed by a lamp other than the rear combination lamp 10, and the second light-emitting area A2 may also be formed by a lamp other than the lid lamp 20.

All of the numerical values shown in the embodiments described above are exemplified, therefore, any appropriate numerical value different from this can be used.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicular lamp comprising:
a first light-emitting area and a second light-emitting area which are arranged to be adjacent to each other in a horizontal direction with a gap formed therebetween;
a third light-emitting area which is visually observed through the gap;
a gap light-emitting unit disposed behind the gap; and
a light control unit disposed between the gap and the gap light-emitting unit, wherein
the gap light-emitting unit includes a front view light-emitting unit and an upper view light-emitting unit disposed below the front view light-emitting unit,
the upper view light-emitting unit and the light control unit each have a lower portion that extends downward from the gap, and
the light control unit includes an optical element which directs light from the upper view light-emitting unit to travel by a predetermined angle upward with respect to a horizontal plane so that the light from the upper view light-emitting unit passes through the gap.

2. The vehicular lamp according to claim 1, wherein
the optical element includes a plurality of lens cuts configured to refract the light from the upper view light-emitting unit by a first angle upward with respect to the horizontal plane,
the plurality of lens cuts are arranged in a vertical direction, and
as the lens cut is located at a lower position, the first angle is made larger.

3. The vehicular lamp according to claim 2, further comprising any one of a diffusion lens unit and a diffusion surface configured to diffuse light controlled by the light control unit, wherein
the diffusion lens unit or the diffusion surface is disposed between the light control unit and the gap.

4. The vehicular lamp according to claim 3, wherein
the first light-emitting area is disposed at a rear end portion of a vehicle, and
the second light-emitting area is disposed at a movable portion, movable in respect to the first light-emitting area.

5. The vehicular lamp according to claim 2, wherein
the first light-emitting area is disposed at a rear end portion of a vehicle, and
the second light-emitting area is disposed at a movable portion, movable in respect to the first light-emitting area.

6. The vehicular lamp according to claim 1, wherein
the optical element includes an upper view shutter group including a plurality of inclined shutters,
the inclined shutters are arranged to be spaced apart from one another in the vertical direction so that light traveling upward by a predetermined angle with respect to the horizontal plane, contained in the light from the upper view light-emitting unit passes the inclined shutters, and
as the inclined shutter is located at a lower position, a second angle of the inclined shutter with respect to the horizontal plane can be made larger.

7. The vehicular lamp according to claim 6, wherein
the light control unit includes a front view shutter group including a plurality of horizontal shutters, the plurality of horizontal shutters are arranged to be spaced apart from one another in the vertical direction so that light traveling in the horizontal direction, contained in the light from the front view light-emitting unit passes through the horizontal shutters, the front view shutter group is disposed across a common opening above the upper view shutter group, and as the horizontal shutter is located at a lower position, the plurality of horizontal shutters have a shorter length.

8. The vehicular lamp according to claim 7, further comprising any one of a diffusion lens unit and a diffusion surface configured to diffuse light controlled by the light control unit, wherein the diffusion lens unit or the diffusion surface is disposed between the light control unit and the gap.

9. The vehicular lamp according to claim 8, wherein the first light-emitting area is disposed at a rear end portion of a vehicle, and the second light-emitting area is disposed at a movable portion, movable in respect to the first light-emitting area.

10. The vehicular lamp according to claim 7, wherein the first light-emitting area is disposed at a rear end portion of a vehicle, and the second light-emitting area is disposed at a movable portion, movable in respect to the first light-emitting area.

11. The vehicular lamp according to claim 6, further comprising any one of a diffusion lens unit and a diffusion surface configured to diffuse light controlled by the light control unit, wherein the diffusion lens unit or the diffusion surface is disposed between the light control unit and the gap.

12. The vehicular lamp according to claim 11, wherein the first light-emitting area is disposed at a rear end portion of a vehicle, and the second light-emitting area is disposed at a movable portion, movable in respect to the first light-emitting area.

13. The vehicular lamp according to claim 6, wherein the first light-emitting area is disposed at a rear end portion of a vehicle, and the second light-emitting area is disposed at a movable portion, movable in respect to the first light-emitting area.

14. The vehicular lamp according to claim 1, further comprising any one of a diffusion lens unit and a diffusion surface configured to diffuse light controlled by the light control unit, wherein the diffusion lens unit or the diffusion surface is disposed between the light control unit and the gap.

15. The vehicular lamp according to claim 14, wherein the first light-emitting area is disposed at a rear end portion of a vehicle, and the second light-emitting area is disposed at a movable portion, movable in respect to the first light-emitting area.

16. The vehicular lamp according to claim 1, wherein the first light-emitting area is disposed at a rear end portion of a vehicle, and the second light-emitting area is disposed at a movable portion, movable in respect to the first light-emitting area.

\* \* \* \* \*